(12) United States Patent
Müller et al.

(10) Patent No.: US 7,636,854 B2
(45) Date of Patent: Dec. 22, 2009

(54) SECURITY DEVICE FOR ONLINE TRANSACTION

(75) Inventors: Lorenz Müller, Bienne (CH); Marcel Jacomet, Lengnau (CH)

(73) Assignee: AXSionics AG, Biel (CH)

( * ) Notice: Subject to any disclaimer, the term of this patent is extended or adjusted under 35 U.S.C. 154(b) by 853 days.

(21) Appl. No.: 10/476,736

(22) PCT Filed: May 2, 2002

(86) PCT No.: PCT/CH02/00240

§ 371 (c)(1),
(2), (4) Date: Nov. 3, 2003

(87) PCT Pub. No.: WO02/091139

PCT Pub. Date: Nov. 14, 2002

(65) Prior Publication Data

US 2004/0148510 A1      Jul. 29, 2004

(30) Foreign Application Priority Data

May 3, 2001    (EP) .................................. 01810436

(51) Int. Cl.
*H04L 9/32* (2006.01)
*G06F 21/00* (2006.01)
(52) U.S. Cl. .......................................... 713/186; 726/9
(58) Field of Classification Search ................. 713/161,
713/168, 172, 184, 186; 726/2, 5, 9; 340/825.31,
340/825.34; 382/115, 116, 117, 124; 235/380,
235/382, 486; 283/68; 705/41
See application file for complete search history.

(56) References Cited

U.S. PATENT DOCUMENTS

| 5,136,644 | A | 8/1992 | Audebert et al. ............... 380/25 |
| 5,432,851 | A | 7/1995 | Scheidt et al. ................ 380/25 |
| 6,069,970 | A | 5/2000 | Salatino et al. ............. 382/124 |
| 6,182,221 | B1 * | 1/2001 | Hsu et al. ................... 713/186 |
| 6,213,403 | B1 | 4/2001 | Bates, III .................... 235/492 |
| 6,484,260 | B1 * | 11/2002 | Scott et al. .................. 713/186 |
| 6,751,734 | B1 * | 6/2004 | Uchida ....................... 713/186 |
| 7,310,734 | B2 * | 12/2007 | Boate et al. ................. 713/186 |
| 2002/0060243 | A1 * | 5/2002 | Janiak et al. ................ 235/382 |
| 2002/0112183 | A1 * | 8/2002 | Baird et al. ................. 713/201 |
| 2004/0015704 | A1 * | 1/2004 | De Schrijver ............... 713/186 |

FOREIGN PATENT DOCUMENTS

| DE | 4 125 198 | 5/1992 |
| WO | WO 87/03977 | 7/1987 |

* cited by examiner

*Primary Examiner*—Gilberto Barron, Jr.
*Assistant Examiner*—Abdulhakim Nobahar
(74) *Attorney, Agent, or Firm*—The Webb Law Firm

(57) ABSTRACT

The invention concerns a security device (10) for online transaction between a service provider equipped with a computer (15) and operator equipped with a computerized station comprising a display (16) and a keyboard (18). The device essentially comprises: a signal receiving element (22) designed to be pressed against said display (16) for receiving a signal coming from said computer (15), said signal being processed to generate a code, and communication means (24) to provide the operator with access to said code. It further comprises a biometric sensor (26) adapted to acquire data concerning the operator, and a locking and unlocking member arranged between the signal receiving element (22) and the communication means (24), the code being accessible only in case of conformity between the read fingerprint and the stored imprint.

8 Claims, 2 Drawing Sheets

SECURITY DEVICE FOR ONLINE TRANSACTION

Figure 1:
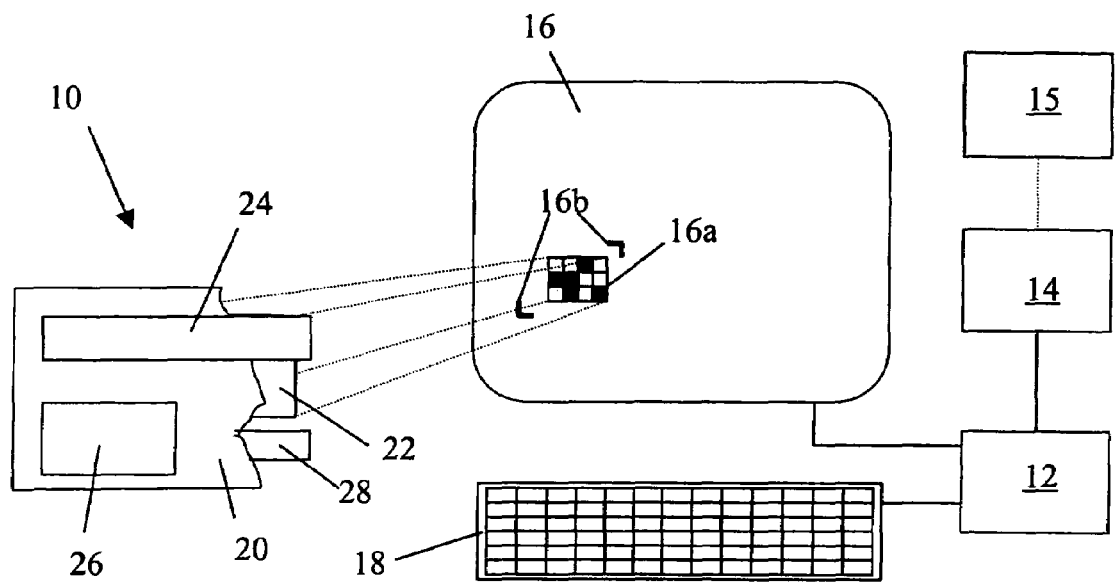

The present invention pertains to security devices, of the type of those intended for identifying a partner and/or ensuring the integrity of a communication during an online transaction, for example on the Internet network. Such devices are particularly useful during purchases by e-mail or for paying for services such as the issuing of licenses or the ordering of documents.

A device of this type is described in document U.S. Pat. No. 5,136,644. It takes the form of a box comprising a microcontroller, a photosensitive sensor formed of three in-line phototransistors and intended to be applied against a screen, for example a computer screen, so as to receive a coded optical signal, a keyboard making it possible to forward a message, a display whereby the information received by the device or the information to be sent by means of the keyboard is rendered accessible, and a link with a station, for example a computer, a television screen or a telephone terminal.

The signal is analyzed by the device and an access code, obtained by processing the information contained in the signal with the program of the microcontroller, is displayed by the screen. This code is then typed in on the keyboard, to afford access to a site or a payment order.

Such a device requires means of linking with the station, that has to be tailored for this purpose. Moreover, the configuration of the photosensitive sensor limits the flow of information transmitted in optical form to a maximum of a few hundred bits. Beyond this, the time required for transmission exceeds 2 to 3 seconds, beyond which time the wait becomes disagreeable and the stability of the device is difficult to ensure.

Document U.S. Pat. No. 5,432,851 relates to an access control system calling upon a computer furnished with a screen and with a keyboard, and a control device comprising a photoelectric sensor making it possible to receive a signal through the screen, an electronic circuit for processing the signal, a display as well as a memory containing information allowing decryption of the signal, so as to generate an access code rendered accessible by means of the display.

This document says nothing vis à vis the photoelectric sensor. At the very most, it may be construed as suggesting that it could be formed of a single component, the information being addressed by a succession of light and dark dots at a point of the screen. The transmission speed would then be still lower than in the device described above.

An operator can access the information contained in the computer or in another computer, these being networked, by entering this code by means of the keyboard, the transmission of the information being performed in an encrypted and hence safer manner. However, the risks of illicit use in case of theft, or of dispute by the bearer, cannot be eliminated.

Stated otherwise, it is possible to prevent a code being stolen, owing to the fact that it changes with each intervention. Moreover, the device can be used with computers of any type, even in a public place, without any risk of the code used thereby being appropriated. On the other hand, in case of theft of the device itself, access to the information is no longer secure. The aim of the present invention is to alleviate this drawback.

Document WO 87/03977 relates to a control system serving as key, for controlling access to a computer, by information exchange, in particular by means of a photoelectric sensor. It comprises a box carrying the sensor and in which is housed control electronics. In one variant, it is envisaged that a biometric sensor, capable of being used, apparently instead of the information exchange process, be associated with the photoelectric sensor.

The device according to the invention is therefore intended to ensure secure online transactions between a provider of services and an operator, and to be used by the operator with a station of computer type comprising a screen and a keyboard, and linked at least mediately with a computer managed by the provider, the link being interactive. This device comprises:

a signals reception facility devised to receive a signal originating from the said computer, a read only memory, in which a program for analyzing the signal and a decryption program are recorded, a read only memory of programmable type known by the name PROM or EPROM for example, in which information specific to the operator may be recorded, a microprocessor for implementing these programs and for carrying out the processing and the decryption of the signal received by the signals reception facility and for transforming it into a code, and communication means for rendering the code accessible to the operator.

It is characterized in that it comprises, in addition, a biometric sensor to capture data relating to the operator and a locking/unlocking facility disposed between the signals reception facility and the communication means, in that the read only memory comprises a program for processing the data originating from the biometric sensor, and in that the microprocessor is devised so as to:

implement the processing program so as to generate an information item from the data captured by the biometric sensor, compare the information item thus obtained with the information contained in the read only memory of programmable type, order the locking/unlocking facility in case of conformity, transmit the code to the communication means so as to render it accessible to the operator, so as to allow him to enter it by means of the keyboard and transmit it to the computer, with a view to authorizing the transaction.

Admittedly it is known, through documents U.S. Pat. No. 6,213,403 and DE 41 25 198 in particular, to call upon biometry in the field of security. Document U.S. Pat. No. 6,213,403 describes a credit card furnished with a fingerprint reader and with a connector making it possible to link the card to a terminal making it possible to read the information emanating from the card and to send this information to the service provider's computer. Such a solution therefore requires complementary means which are not necessarily available. Moreover, they involve electrical contacts whose reliability may be problematic. Moreover, the volume of information to be transmitted is sizeable in order to allow safe identification of the operator and thus be able to differentiate him from all the other registered customers.

The apparatus described in document DE 41 25 198 comprises a memory in which information is stored and a biometric sensor allowing or not allowing access to the information in memory. This solution is proposed as an alternative to the inputting of a code.

Stated otherwise, none of the documents mentioned above describes a device allowing information exchange with a remote computer calling upon a minimum of information to be transmitted while guaranteeing the security offered by a device of biometric type, in contrast to the device according to the invention. This advantage is obtained by virtue of the fact that the biometric sensor orders the unlocking of the communication means allowing the linkup with the computer with which the device is communicating.

In the device according to the invention, the data corresponding to the morphology of the operator are placed in memory in its programmable type read only memory, so that the identification of the individual is effected by the device itself. It is thus not necessary to have his print recorded by the central computer. Problems relating to the protection of data relating to individuals can thus be avoided.

Advantageously, the signals reception facility is a sensor of photoelectric type, the communication means are formed of a display cell, and the biometric sensor is devised so as to read a fingerprint.

Good working conditions may be obtained with a photoelectric sensor formed of a matrix of photoelectric cells whose pitch is at least twice as small as that of the matrix of dots that emanates from the signal originating from the computer and is displayed on the screen. An optic, advantageously formed of a convergent lens, is disposed in front of each of the photoelectric cells, so as to bring about the convergence of the light originating from only a portion of the screen, this portion being smaller than one of the dots of the matrix of dots.

Figure 2:
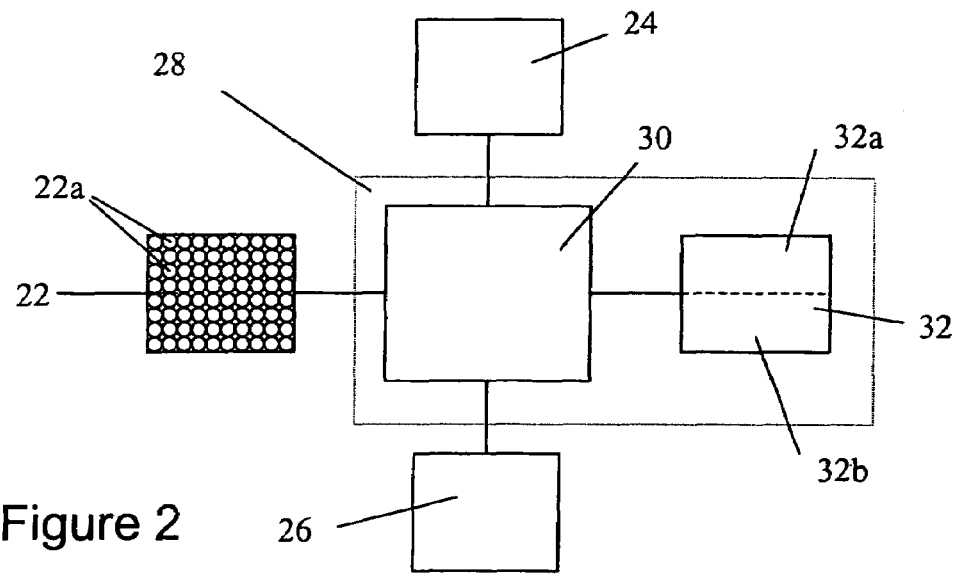
Figure 3:
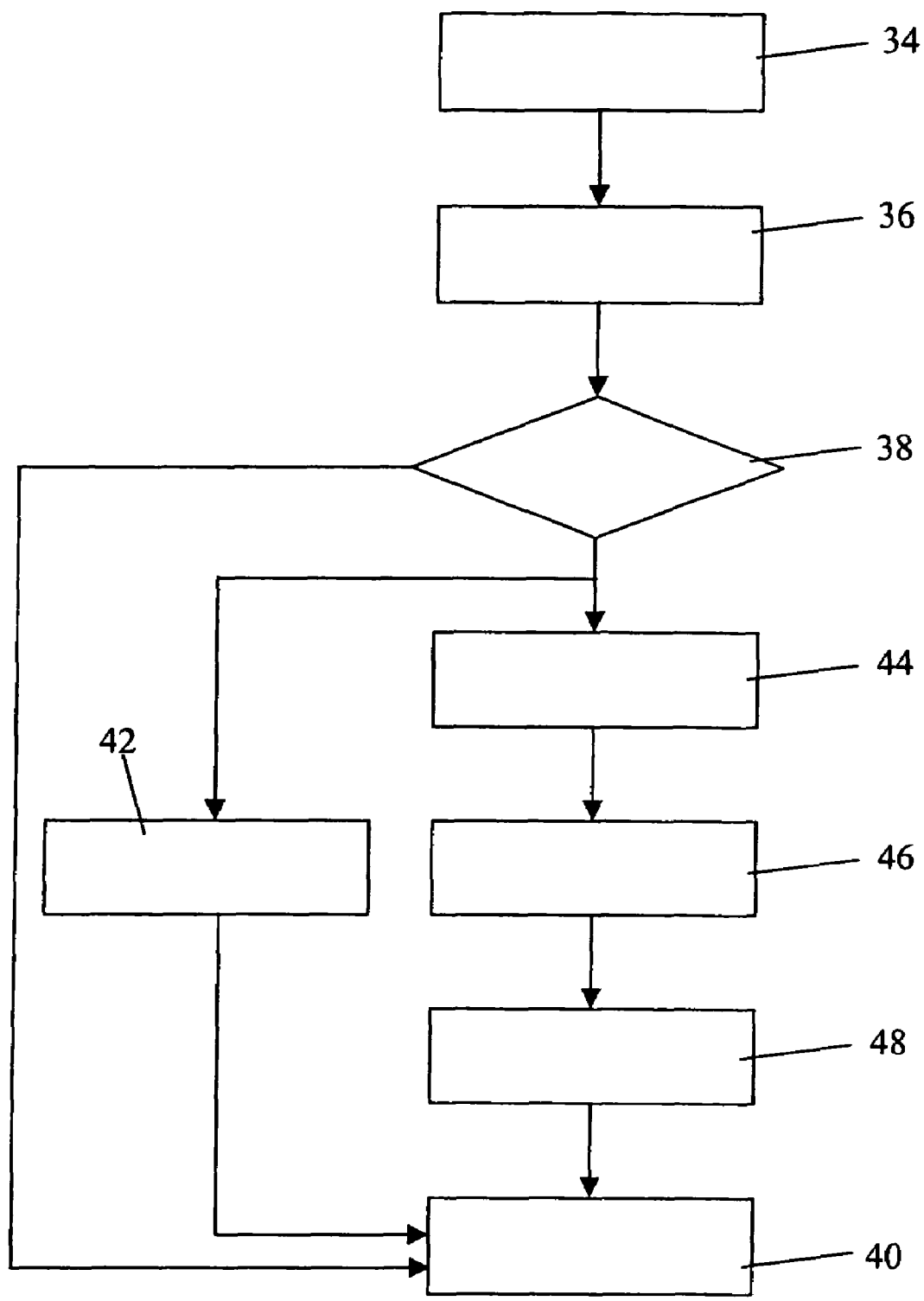

Other advantages and characteristics of the invention will emerge from the description which follows, given with regard to the appended drawing, in which:

FIG. 1 shows a security device according to the invention, in the environment allowing its deployment, FIG. 2 is a logic diagram of the device according to the invention, and FIG. 3 represents a flowchart relating to the manner of operation of the device.

FIG. 1 represents, diagrammatically, a security device 10 according to the invention, disposed in a computing environment calling upon a computer comprising more particularly a central processing unit 12 linked to a modem 14 for allowing a link to a network such as the Internet and, through the latter, to a service provider computer 15, a screen 16 and a keyboard 18, that are likewise linked to the central processing unit 12.

A portion of the screen 16 displays a rectangular zone formed of an alternation of black and white dots, defining a binary matrix structure 16a, whose origin and function will be explained in greater detail hereinbelow, as well as two markers 16b intended to allow the positioning of the device 10 on the screen 16.

The device 10 takes the form of a card, advantageously of the customary format for credit cards, and comprising a plastic plate 20, forming a support and defining the surround of the device and part of which has been cut away so as to reveal the components integrated therein. These components are a sensor 22 ensuring a signals reception facility function, visible on the rear face of the plate 20, a display cell 24 and a biometric sensor 26 that are visible on the front face of the plate 20, and control electronics 28 integrated into the plate 20. The sensor 22 can be supplemented with an infrared detector and/or an RFID receiver, that are often available with modern computers and which also play the role of signals reception facility.

These components are powered by an electrical energy source, not represented in the drawing, which may be a battery or a set of photoelectric cells powering an accumulator or a capacitor.

The sensor 22 is formed of a matrix of photoelectric cells 22a of similar type to those used in videocameras, having a pitch around two to three times less than the pitch of the matrix structure 16a, each cell comprising a microlens for focusing the light originating from a smaller portion of the screen 16 than a dot of the matrix structure 16a. It is linked to the control electronics 28.

The display cell 24 is of liquid crystal type, making it possible to display at least six digits, advantageously up to ten digits or letters.

Both the sensor 22 and the cell 24 are of a make that is standard to the person skilled in the art and exhibit no particular characteristic.

The biometric sensor is of the type marketed by the firm Infineon AG (Stuttgart, Germany) under the name "FingerTIP", or described in patent U.S. Pat. No. 6,069,970. This type of sensor can be housed in a very restricted space and consumes little energy while allowing an individual to be identified from a fingerprint. It requires, furthermore, modest computing means, as will be apparent later.

As shown by FIG. 2, the control electronics 28 comprises a microprocessor 30 and a memory 32 linked to the microprocessor in such a way as to allow an exchange of information between them. The microprocessor 30 receives information from the photoelectric sensor 22 and from the biometric sensor 26, and transmits orders to the display cell 24.

The microprocessor 30 is devised to perform three types of operations, i.e.:

analysis of the information originating from the biometric sensor 26 which, in case of positive result, instructs a time-delayed unlocking that authorizes the other functions;

decryption of the information received by the sensor 22; and control of the display 24 on the basis of the information obtained during decryption.

These operations are performed in conjunction with the programs and the information stored in the memory 32. The latter comprises a first part 32a, nonvolatile or read only, in which are recorded the control programs for the microprocessor 30, of type generally known by the name ROM memory, and a second part 32b, formed of a programmable read only memory, for example of the PROM type, that is to say that can be programmed once and in which there is information specific to the device and to its operator, referring on the one hand to decryption, on the other hand to biometry. It would also be possible to use a memory of EPROM type, that is to say one allowing reprogramming under certain conditions.

For a proper understanding of these operations, the description will firstly detail the manner of operation of the device, then the control logic applied by the microprocessor 30.

Before being able to be used, the device must be initialized. A program is entered into the memory 32b, from the computer 15. This program makes it possible to generate, from the information received by the sensor 22, a numerical or alphanumeric code, typically from 6 to 10 signs. It must be possible for the same operation to be carried out by the computer 15, when it is invoked, as will be detailed later.

The device must, furthermore, record one or two fingerprints of the operator who alone will subsequently be empowered to use the device. The latter is then ready to be used.

When the operator wishes to call upon a service catered for by the computer 15, he begins by linking the central processing unit 12 to the computer, through the modem 14, according to the customary procedures, by giving his identity, for example by means of an input code of the type called a PIN code.

In parallel with this, he triggers the device 10, it being possible for the triggering to be done by simple exposure to light when the energy source is formed of photoelectric cells, then he applies, to the biometric sensor 26, the finger whose print is recorded. The print of the finger applied is read and processed by the microprocessor 30 and the information obtained is compared with that recorded in the memory 32b. If the comparison leads to a match of the shapes, then the microprocessor 30 interrogates the photoelectric sensor 22.

If the energy source is formed of photoelectric cells, the device will advantageously comprise a capacitor whose capacitance makes it possible to cater for the peaks in consumption corresponding to the periods during which the control electronics 28 are heavily invoked.

The device 10 is subsequently applied against the screen 16, aligned with the markers 16b, in such a way that the sensor 22 is opposite the image 16a. Since the pitch of the matrix of the photoelectric cells 22a of the sensor 22 is two to three times less than that of the dot matrix displayed by the image 16a, several neighboring cells receive the same information item. Through a proximity analysis, it is possible for the microprocessor 30 to reconstruct the image 16a and, thereby its binary equivalent. This equivalent is processed by the decryption program of the microprocessor 30, so as to obtain the code which is displayed on the display cell 24.

If the communication is effected with an interface of infrared or RFID type for example, the information is obtained directly and returned in a binary manner.

It then remains for the operator to enter this code by means of the keyboard 18 into the central processing unit 12 and, through the modem 14, to forward it to the computer 15, which compares it with the reference one. Should there be a match, the computer then allows the transaction.

Hence, the computer 15 knows with certainty the individual with whom it is linked up, through the combination of the biometric lock and of the decryption device. Moreover, the operator can be certain that it will not be possible for his card to be used by another individual, even in case of loss or of theft.

It goes without saying that the device is devised in such a way that the content of the memory 32b is made secure, stated otherwise that its content cannot be read or reproduced. This can be done in a manner well known by the person skilled in the art, by the application of means known as "tampering proof".

In cases where the code is relatively short, it could be possible for an individual not having a device according to the invention to connect up to the computer 13 and, when the image 16a appears, to send a random code that gives him access to the computer 15, in an unauthorized manner. Such misuse can be eliminated by demanding two successive codes.

FIG. 3 represents a flowchart of the programs applied by the microprocessor 30. The first operation 34 consists in triggering the device. The operator's print is subsequently read at 36, then compared with the information in the memory 32b. If the comparison arrives at a negative result, the device is, without further ado, stopped, as represented at 40. If the response is positive, a timer is set going at 42 and the microprocessor 30 processes the information gathered by the sensor 22 and decrypts it at 46, to obtain the access code. The latter is subsequently forwarded at 48 to the display 24 to render it accessible to the operator.

Stated otherwise, the microprocessor 30 acts as a locking/unlocking facility, disposed between the photoelectric sensor 22 and the display cell 24, and allowing the reading of the code only if the print read by the sensor 26 conforms to the information in the programmable read only memory 32b.

When the time delay has elapsed, which is of the order of a minute, the device is stopped, as indicated at 40.

The device according to the invention can form the subject of numerous variants. The number of dots making up the matrix 16a can vary considerably as a function of the security that one wishes to have in the communication.

The matrix of dots can be replaced by an image, colored or otherwise, the microprocessor then being provided with a program allowing analysis thereof. The means of communication could also be formed with a sound source, and this would make it possible, for example, for a person with impaired vision to profit from the advantages of the device.

The reading of a fingerprint is particularly simple and effective. It would also be possible to apply the same method to other parts of the operator's body, for example to the iris of the eye.

The applications of this device are numerous. In addition to electronic commerce, it can also be used with apparatus of bank bill dispensers, the reading screen and the control dial sufficing for communication with the computer 15. They may also cater for a voter card function, for accomplishing acts such as an electronic ballot by Internet network, or even an identity card function, or be associated with a passport.

It is also possible to operate access to confidential information stored in a computer, but without having to go via a modem. In this case, the computer 15 is linked directly to the screen 16 and to the keyboard 18.

It is of course understood that the device comprises a random access memory, of RAM type for example, which has not been described, for storing information currently being processed.

The invention claimed is:

1. A security device for online transaction between a service provider furnished with a computer and an operator furnished with a station of computer type, wherein the operator computer station comprising a screen and a keyboard is linked at least mediately and in an interactive manner with said service provider computer, said security device comprises:
    a signals reception facility devised to receive a signal originating from said operator computer station;
    a first read only memory of programmable type, in which a program for analyzing the signal and a program for decryption are recorded;
    a second read only memory of programmable type, adapted to record information specific to the operator;
    a microprocessor for implementing said programs and for carrying out the processing and the decryption of an encrypted signal received by the signals reception facility, by means of the information contained in the memory, and for transforming it into a code;
    communication means for rendering said code accessible to the operator;
    a biometric sensor devised to capture biometric data from the operator;
    a locking/unlocking facility disposed between the signals reception facility and the communication means;
    wherein said first read only memory of programmable type comprises a program processing program for processing the biometric information originating from the biometric sensor;
    wherein said signals reception facility is a photoelectric sensor and said communication means are a display cell; and
    wherein said microprocessor is devised to implement the processing program to generate an information item from the biometric data captured from the operator by said biometric sensor, to compare the information item with the information previously stored in the second read only memory of programmable type, to order the locking/unlocking facility in case the comparison leads to a match, to transmit said code to the communication means to render it accessible to the operator, to allow the operator to enter said code by means of the keyboard and transmit it to said service provider computer, with a view to authorizing said transaction.

2. The security device as claimed in claims 1, wherein said biometric sensor is devised so as to read a fingerprint.

3. The security device as claimed in claim 1, configured to read the signal originating from the computer station displayed on the screen in the form of a matrix of dots, wherein the photoelectric sensor is formed of a matrix of photoelectric cells, whose pitch is at least twice as small as the pitch of the matrix of dots, and of an optic disposed in front of each of said cells to bring about the convergence of the light originating from only a portion of the screen, which portion is smaller than one of said dots of the matrix.

4. The security device as claimed in claim 3, wherein said optic is formed of a convergent lens.

5. The security device as claimed in claim 3, wherein said optic is formed of a convergent light guide.

6. The security device as claimed in claim 1, configured to read the signal originating from the computer station displayed on the screen in the form of a matrix of dots, wherein the screen display comprises markers outside the displayed matrix of dots for adjusting the position of the device and photoelectric sensor thereof against the screen.

7. The security device as claimed in claim 1, configured to read the signal originating from the computer station displayed on the screen in the form of a matrix of dots, wherein the photoelectric sensor is formed of a matrix of photoelectric cells having sensitive zones arranged such that they are sufficiently separated to match the different dots on the screen when the device is held on the screen.

8. The security device as claimed in claim 7, wherein the screen display comprises markers outside the displayed matrix of dots for adjusting the position of the device and photoelectric sensor thereof against the screen.

\* \* \* \* \*

UNITED STATES PATENT AND TRADEMARK OFFICE
CERTIFICATE OF CORRECTION

| | | |
|---|---|---|
| PATENT NO. | : 7,636,854 B2 | Page 1 of 1 |
| APPLICATION NO. | : 10/476736 | |
| DATED | : December 22, 2009 | |
| INVENTOR(S) | : Müller et al. | |

It is certified that error appears in the above-identified patent and that said Letters Patent is hereby corrected as shown below:

Title Page, Item [*]

Delete the phrase "by 853 days" and insert -- by 1605 days --.

Column 7, Line 10, Claim 2, "in claims 1" should read -- in claim 1 --.

Signed and Sealed this

Tenth Day of August, 2010

David J. Kappos
*Director of the United States Patent and Trademark Office*